and longitudinal plane through the infeed conveyor. In addition, each carriage is provided with a centering member for centering and holding the ends of the logs which are carried thereby in the longitudinal central plane. Finally, the infeed conveyor is provided with control means for controlling the driving of the carriages in dependence upon the advance of the logs to the conveyor.

United States Patent

[11] 3,608,700

[72] Inventor Philip Nilsson
        Soderhamn, Sweden
[21] Appl. No. 884,654
[22] Filed Dec. 12, 1969
[45] Patented Sept. 28, 1971
[73] Assignee Kockum Soderhamn Aktiebolag
        Soderhamn, Sweden

[54] INFEED CONVEYOR
    8 Claims, 9 Drawing Figs.
[52] U.S. Cl. .................................................. 198/179,
                                                            198/110
[51] Int. Cl. .................................................. B65g 15/00
[50] Field of Search ........................................ 198/179,
                                                            110, 76, 200

[56] References Cited
        UNITED STATES PATENTS
3,072,095  1/1963  Keessen et al. ............... 198/76 X
3,155,221  11/1964  Griner ........................ 198/76 X Primary Examiner—Richard E. Aegerter
Assistant Examiner—Douglas D. Watts
Attorney—Brumbaugh, Graves, Donohue & Raymond ABSTRACT: An infeed conveyor for feeding elongated material such as logs or blocks into a sawing machine, a logging machine or the like. The infeed conveyor is provided with carriages guided in an endless path for carrying one end of a log or block to a sawing or logging machine and then returning to a standby position. According to the invention, the infeed conveyor comprises at least two independently driven endless conveyor means disposed in parallel, e.g., in the form of conveyor chains arranged in pairs. Each of the conveyor means is arranged to drive one of the carriages that carry one end of a log or block. Beneath the path of movement of the carriages there is provided a trough for guiding the other end of each conveyed log or block in a longitudinal direction in a centered position relative to a central, vertical

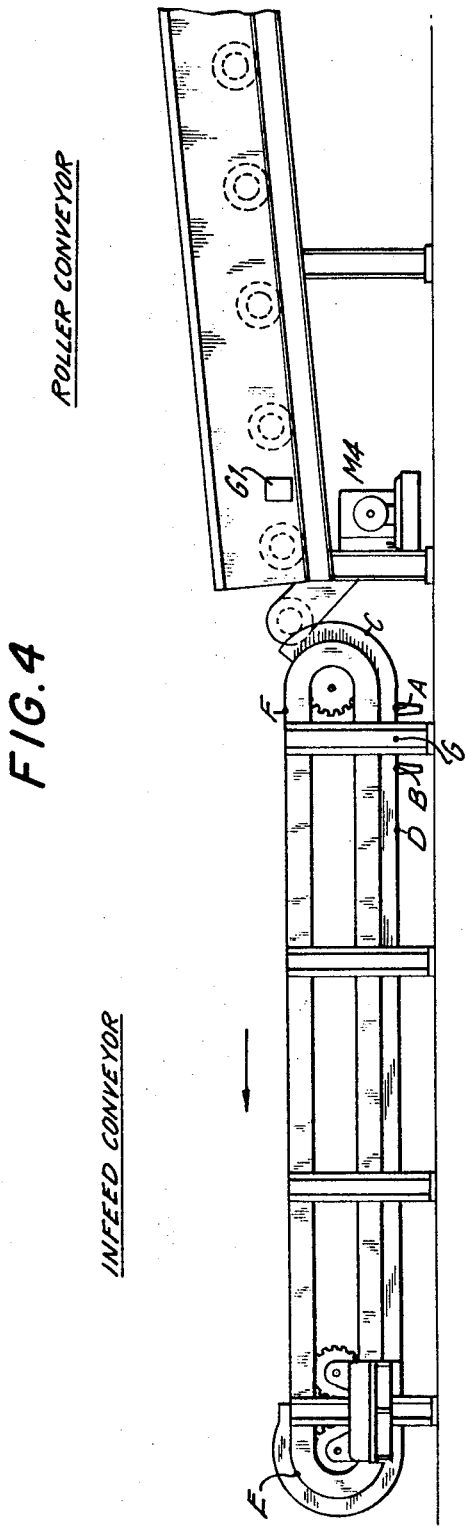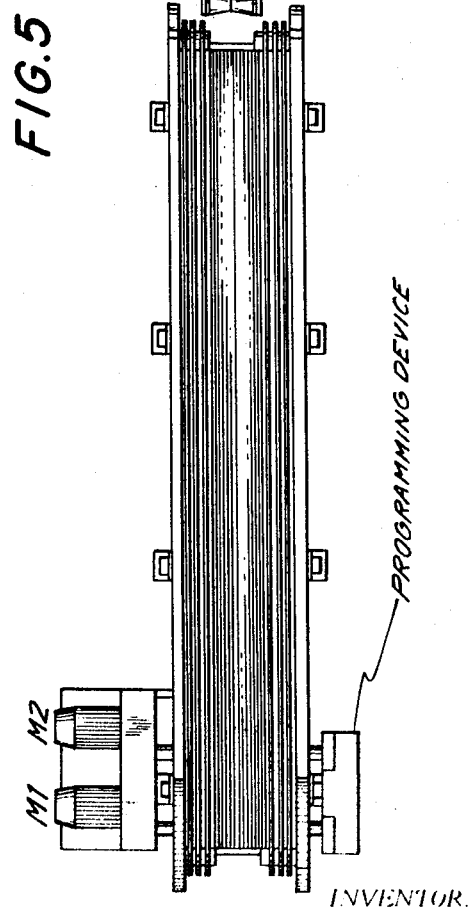

3,608,700

1

INFEED CONVEYOR

BACKGROUND OF THE INVENTION

The present invention relates to an infeed conveyor for feeding logs or blocks to a sawing machine, a so-called logging machine or the like. The infeed conveyor is of the general type having carriages guided in an endless path for conveying the logs or blocks in their longitudinal direction toward the sawing or logging machine.

The expression "logging machine" is used herein to designate a machine which, starting from a round log, imparts to the log the shape of a block with at least two parallel surfaces, either by sawing or by cutting up the side portions into chips for pulping. Such cutting operations are also known as "-plan reducing."

A number of infeed conveyors of the type to which the present invention relates are presently known in the art. One such conveyor consists of a continuously running chain or a similar endless drive means located close to guide means extending along a vertical longitudinal central plane for guiding a number of log carriages which are adapted to be selectively brought into engagement with the endless drive means and moved along thereby in the direction of the sawing or logging machine. After the log carriages have traversed the length of the infeed conveyor they are disengaged from the endless drive means and returned to a magazine at the infeed end of the conveyor.

At the infeed end, there is provided an aligning device for aligning the logs with their centerlines in the vertical longitudinal central plane. The log carriages are adapted, at the beginning of their movement along the guide means when they are brought into engagement with the endless drive means, to lift the ends of the logs from the aligning device.

An infeed conveyor of the kind just described is somewhat complicated and consequently comparatively expensive to manufacture. Furthermore, due to the presence of the aligning device, its conveying capacity is limited.

SUMMARY OF THE INVENTION

The general object of the present invention, therefore, is to provide an infeed conveyor of the type described above which is simpler, and thus also less expensive than the infeed conveyors presently known in the art and which, in addition, renders possible an increased conveying capacity.

It is a further and more particular object of the present invention to provide an infeed conveyor which permits logs and blocks to be placed in their best positions for sawing or plan reducing without the use of any additional positioning or aligning devices mounted ahead of the conveyor.

These objects, as well as other objects which will become apparent in the discussion that follows, are achieved, according to the present invention, by providing a number of endless conveyor means, such as chains, arranged in parallel and securing a log carriage to each so that the carriages will be guided in an endless path.

Each of the carriages is constructed so as to carry one end of a log or block and convey it in the longitudinal direction to the sawing or plan-reducing machine. To effect the proper alignment of the logs or blocks, the carriages are provided with a device for centering and holding the carried end of the log or block in a vertical plane arranged centrally and longitudinally with the infeed conveyor.

The other end of each conveyed log or block is slidably guided in the longitudinal direction by a generally V-shaped guide arranged just beneath the path of movement of the log-carrying carriages. The guide is positioned so that the logs or blocks will be guided in a centered position relative to the central longitudinal plane.

Finally, the infeed conveyor is provided with a drive arrangement for independently driving each of the endless conveyor means as well as a control device which responds to the advancement of the logs or blocks to the infeed conveyor and controls the movements of the drive. The movement of the carriages is thereby controlled in such a manner that, when a log is received at the infeed conveyor, a carriage will move upward from a standby position, lift and carry the intended end of the log or block from one end of the infeed conveyor to the other, and then return again to the standby position.

BRIEF DESCRIPTION OF THE DRAWINGS

FIG. 4 shows diagrammatically a side view.

FIG. 5 is a corresponding plan view of one embodiment of an infeed conveyor.

DESCRIPTION OF THE PREFERRED EMBODIMENTS

The preferred embodiments of the present invention will now be described in detail with reference to the accompanying drawings.

Figure 1:
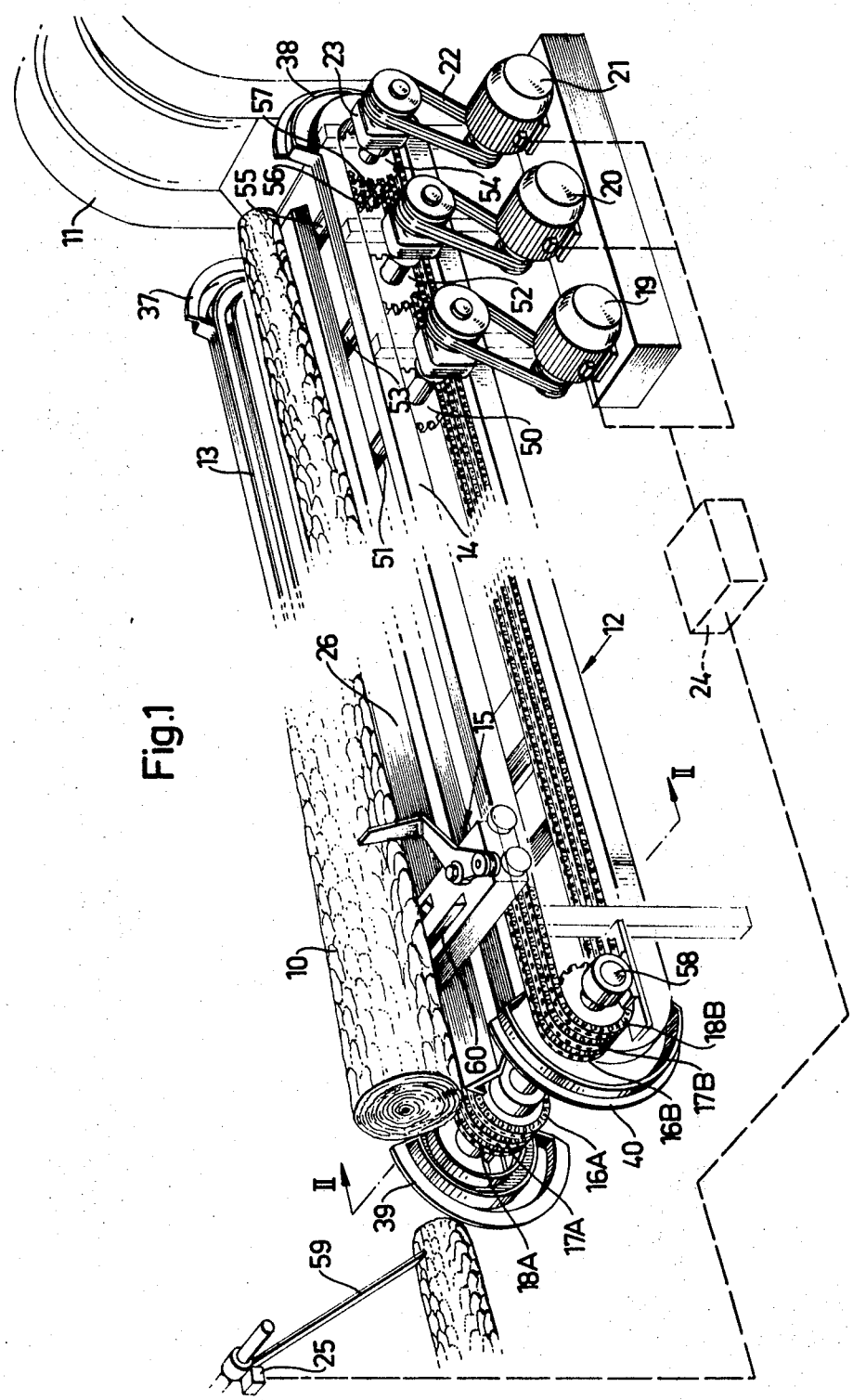
FIG. 1 is a simplified perspective view of a preferred embodiment of an infeed conveyor according to the present invention.

The infeed conveyor shown in FIG. 1 as an example of the invention is intended for feeding logs 10 to a logging machine indicated diagrammatically as 11. The conveyor consists of a beam frame generally designated by 12 and having rails 13, 14 for guiding the conveyor carriages generally designated by 15 and described below in connection with FIG. 3. In the present case, the conveyor is assumed to have three conveyor carriages 15, but nothing prevents the use of only two carriages or of a number of carriages exceeding three.

The conveyor comprises at least two, in the present case three, endless conveying means disposed in parallel to and driven independently of each other. In the present case, the conveying means consist of pairs of conveyor chains 16A, 16B, 17A, 17B and 18A, 18B. Said conveyor chain pairs are driven independently of each other each by means of a drive motor 19, 20 and 21, respectively, via suitable belt transmissions and reduction gear means as indicated by the belt transmission 22 and the stub shaft gear 23 for the outer pair of conveyor chains 18A, 18B, for instance.

The driving of the drive motors 19, 20 and 21 is controlled by a programming mechanism 24 indicated only diagrammatically which, in turn, receives impulses from contact means 25 as will be explained below.

Figure 2:
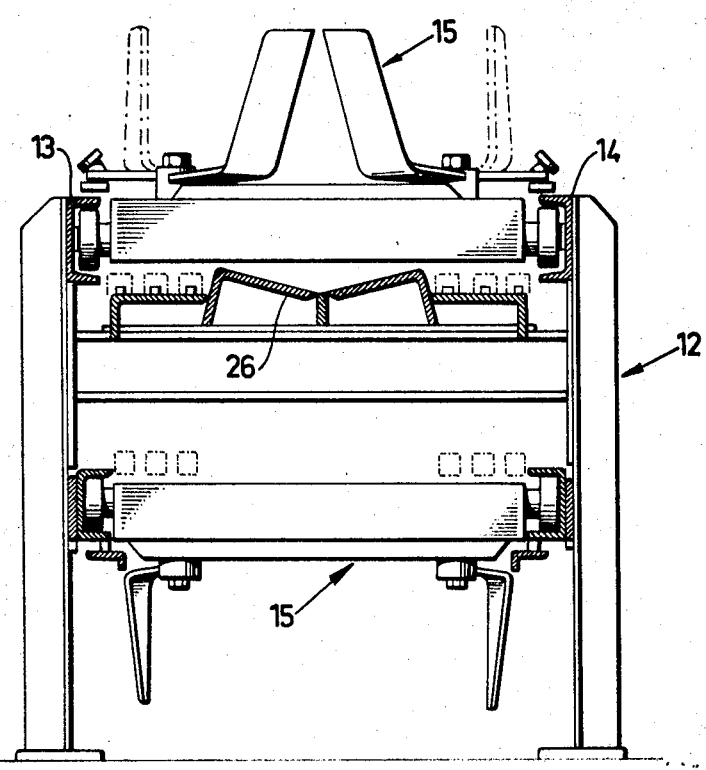
FIG. 2 is a cross-sectional view of the infeed conveyor of FIG. 1 taken along the plane II—II.
Figure 6A:
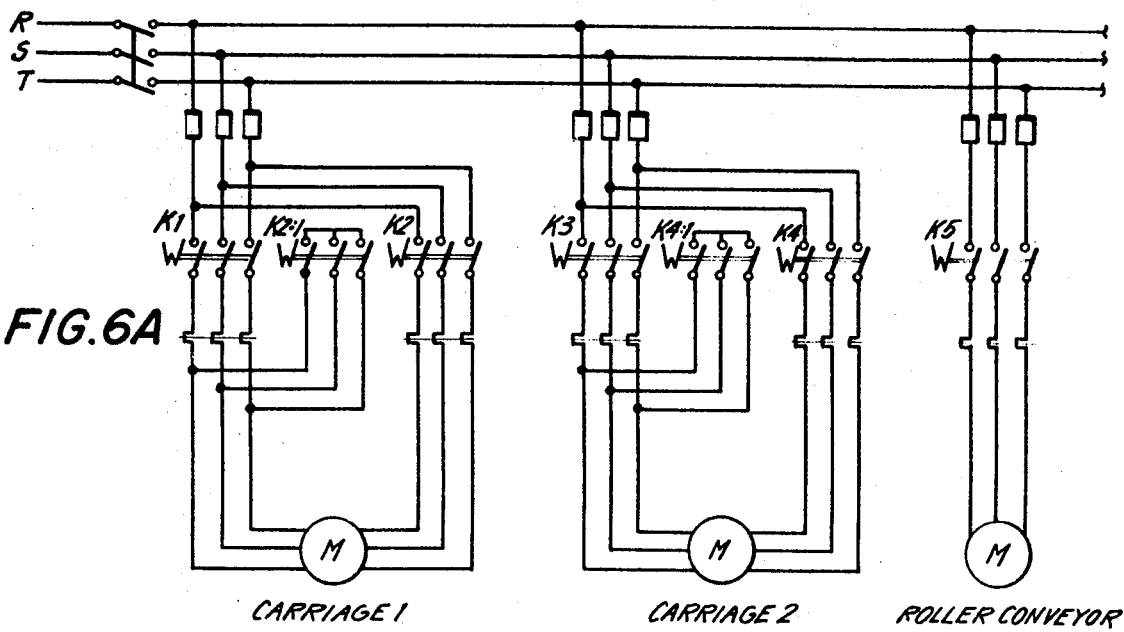
FIGS. 6A–6D are schematic diagrams of a control unit which may be employed with the infeed conveyor of FIG. 1.
Figure 6B:
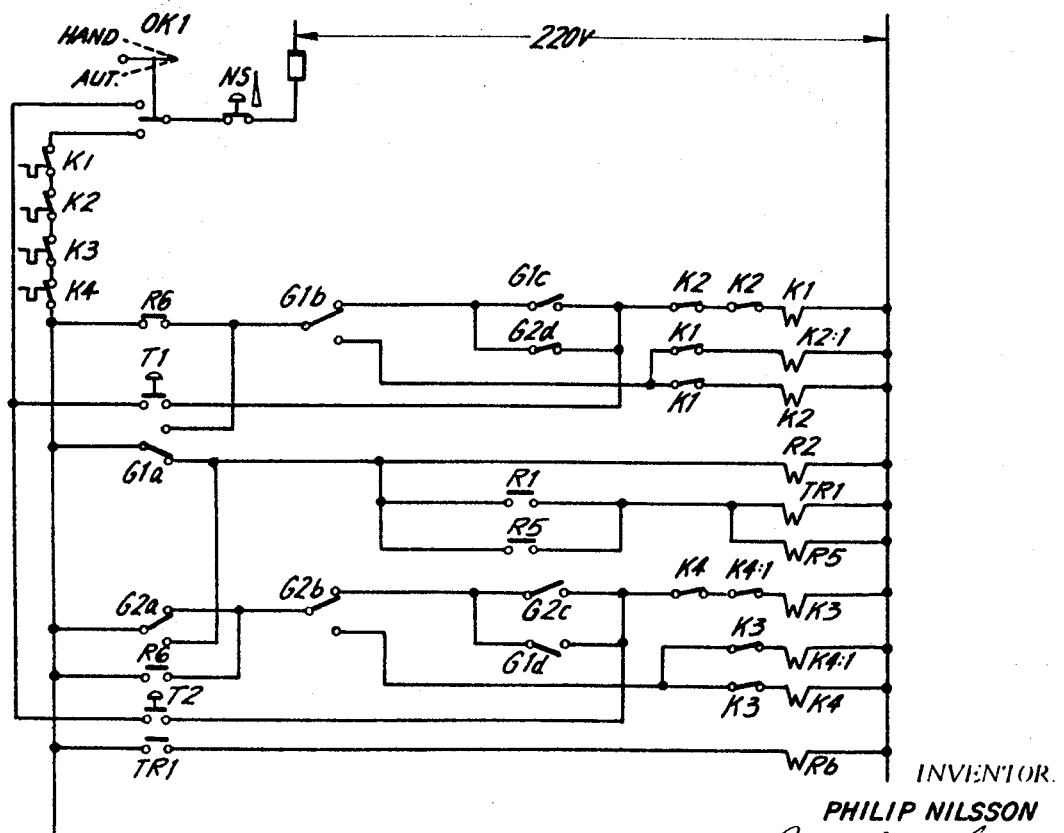
Figure 6C:
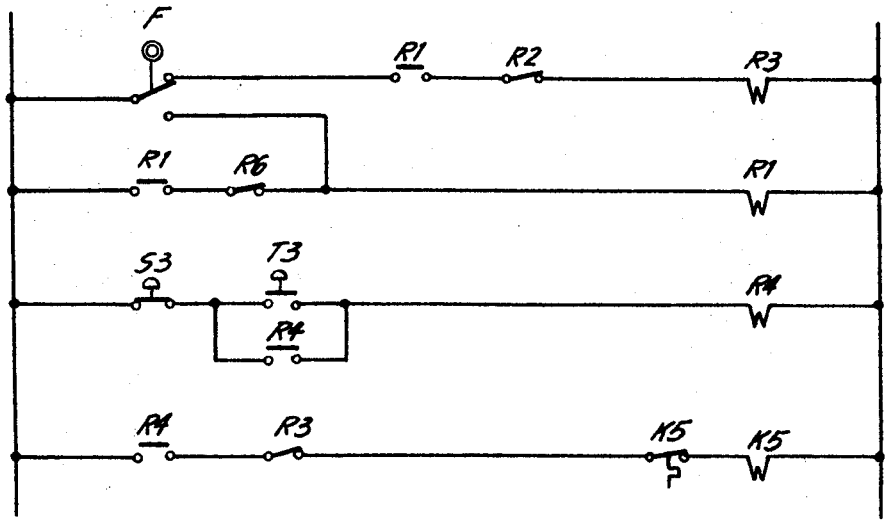
Figure 6D:
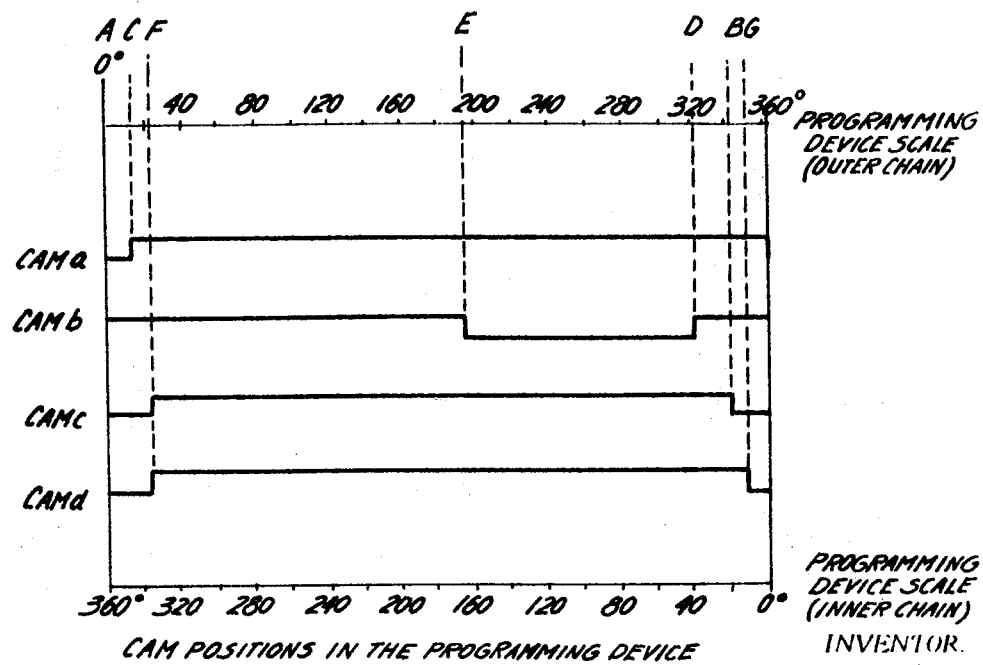

Under the path of movement of the carriages along the upper flight of the conveyor the conveyor has a longitudinal, fixed slide guide namely in this case a rather shallow V-shaped guide groove 26 (FIGS. 1 and 2).

Figure 3:
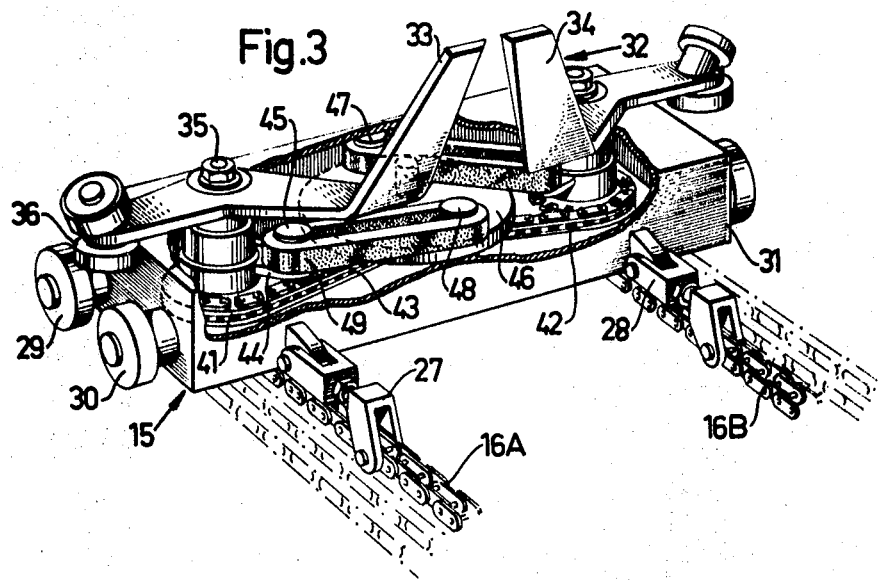
FIG. 3 is a perspective view of a conveyor carriage which may be employed with the infeed conveyor of FIG. 1. Some parts of the figure have been broken away for better clarity.

As seen particularly clearly in FIG. 3, each pair of conveyor chains, in this case the inner pair of conveyor chains, has attachment members 27, 28 for fixed attachment of the conveyor carriage 15 to the associated pair of conveyor chains. The attachment members 27, 28 are designed such that the carriage 15 can move in relation to the conveyor chains in question while being brought along thereby in their circuit along the endless path of movement.

The conveyor carriage 15 which is provided with rollers 29, 30 arranged in pairs at each end is designed as an elongated box 31 and is provided with centering members generally designated by 32. In principle said centering members may be in the form of inclined blocks of rubber or some similar material and of a structural design described in one of our earlier patents. However, it is desirable that the centering members 32 are designed such that they hold the logs or blocks positively, and for this purpose the centering members according to the present invention have been designed as centering arms 33, 34, spring biased towards each other. As shown particularly clearly in FIG. 3, the centering arms 33, 34 are pivotally journaled on vertical shafts, such as the shaft 35, and the centering arms consist of double-armed levers, the outer ends of which carry cam rollers 36 adapted to run on guide curves 37, 38 and 39, 40, respectively, shown only diagrammatically in FIG. 1. For better clarity, said curves have been omitted in FIGS. 2 an 3. Each pivot shaft, the shaft 35 for instance, carries sprockets 41, 42 around which a chain 43 which may be tensioned in a manner not shown is placed crosswise in such a way that the shafts and thus also the centering arms 33 and 34 are positively guided for synchronous movement towards and from each other. The pivot shafts of the centering arms each have a shoulder, such as the shoulder 44 which is provided with a spring mounting 45. Centrally between the shafts there is mounted an adjustable spring mounting lockable in the set position and consisting of a rotatable disc 46 having two diametrically opposed spring mountings 47, 48. A tension spring, in the present case a loop 49 of rubber or similar material, is mounted between the spring mountings of a pair, the spring mountings 45 and 48, for instance. It should be apparent from FIG 3, that by turning the disc 46 it is possible to adjust the tension of the spring at will and thus to set the force by which the centering arms 33, 34 are to hold the log or block.

It may be mentioned that the inner pair of conveyor chains 16A, 16B is driven by a pair of driving sprockets 50 (only one shown) on a shaft 51, while the pair of conveyor chains 17A, 17B is driven by a pair of sprockets 52 on a shaft 53 and the outer pair of conveyor chains 18A, 18B is driven by sprockets 54 on a shaft 55. The shaft 55 also carries rotatably journaled additional sprockets 56, 57 for the two inner pairs of conveyor chains 16A, 16B, 17A, 17B. At the infeed end of the conveyor, the conveyor chains run each over a freely rotatable sprocket journaled on a common shaft.

The infeed conveyor described operates as follows: The logs are fed to the conveyor from a conveyor (not shown) placed in front thereof and conveniently slightly inclined downwards so that one end of the log will rest in the guide 26. When the other end of the log leaves the first conveyor, or slightly before that, a signal is received via the contact arm 59 and the contact 25 to be transmitted by the programming mechanism 24 to one of the drive means 19, 20 or 21 which at the appropriate moment starts the associated pair of conveyor chains so that a carriage which had so far been in a suitable waiting position along the lower flight of the conveyor runs up onto the upper flight of the conveyor to receive the log at a predetermined distance from its outer end. Then the log will momentarily rest with one end in the guide 26 and the other end on a supporting rib 60 on the carriage in question. The centering arms 33, 34 are meanwhile kept apart against the action of the springs 49 by the rollers 36 running on the two guide curves 39, 40. Thereby the log will automatically assume the most favorable position for sawing or logging, i.e. such that the axis of the log which might be curved will align itself such that it will be straight as seen from above. When the carriage 15 then moves slightly forward along the conveyor, the cam rollers 36 will leave the curves 39, 40 and thereby the arms 33, 34 will be brought towards each other into engagement with the log which is simultaneously centered with the end in question located in the middle of a central vertical plane between the centering arms. A similar alignment of the fore end of the log having been carried out before as a result of the effect of the guide 26, it will be appreciated that the log as a whole will lie well centered in said central plane.

It will be appreciated that nothing prevents that another log is advanced with its fore end on the guide 26 very close to the rear end of a preceding log and actually the distance may be as little as zero, i.e. the logs are advanced in such a close sequence that they touch each other end to end.

When said conveyor carriage 15 which has supported the log end reaches the discharge end of the feeder conveyor, i.e. the right end in FIG. 1, the cam rollers 36 for each centering arm 33, 34 run onto slide curves 37, 38 which cause the centering arms to move apart and thus to release the log in question. Then the carriage continues along the lower flight of the conveyor to be stopped again in the waiting position indicated. By proper design of the programming mechanism 24 it is possible to use different speeds for the movement of the carriage along the upper flight of the conveyor and its movement along the lower flight thereof. For instance, the return movement may take place at twice the speed of the feeding movement. Of course, it is also possible to add further functions to the programming mechanism, such as a retardation of the conveyor carriages to a slightly lower speed immediately before their arrival at the waiting position. Of course, further modifications in this respect are possible, but as such functions constitute no part of the invention, it will not be necessary to describe them in this context.

In this example shown in FIGS. 4, 5 and 6A–6D the infeed conveyor has two conveyor carriages driven by separate two-speed brake motors. A synchronously controlled programming device with four cam disks is associated with each carriage.

The operation of the apparatus according to FIGS. 4 and 5 will now be described. When the rear end of the log passes the end switch G1, an impulse is given so that the carriage positioned at A starts. The carriage climbs up, grips the rear end of the log and feeds it into the logging machine, also called a canter. It should be possible to delay the impulse from G1 up to 1 second to make the conveyor carriage grip the log at a sufficient distance from the rear end.

When the carriage that started from A has reached the top side, the carriage positioned at B shall start and proceed to A where it stays until a new impulse has been received from G1.

When the carriage has introduced the log and released it, its speed is doubled from E and it proceeds at the higher speed as far as D where the speed is again reduced. If the preceding carriage is positioned at A, the carriage shall stop at B. If the preceding carriage is not positioned at A, the carriage shall proceed to A and await a new impulse from G1.

If at an impulse from G1 there is no carriage in position A, the roller conveyor and all conveyors on a direct line in front of it shall stop until a carriage arrives at A. The carriage then passes A and the diabolo roller conveyor shall with the other conveyors start again.

If the motor protection switch of any of the carriage motors M1, M2 is triggered, all said motors shall be stopped as well as the roller conveyor and all conveyors on a direct line therewith.

The carriages operate in the way just mentioned and always have the same location in relation to each other.

The programming devices which are controlled in synchronism with the carriages have four cam disks $a$, $b$, $C$, and $d$ which actuate microswitches. The cam disks can be set for an impulse at any point of their revolution. Also, the length of the impulse is adjustable.

The programming device is governed synchronously in such a way that the cam disks rotate one revolution for one cycle of the carriage, from A to A, for example.

Carriages and conveyors should be operable manually independently of each other. Also, it should be possible in a simple way to stop the carriages, the roller conveyor with preceding conveyors when readjusting the logging machine. It should be possible to stop all conveyors and carriages and the discharge means of the logging machine (driven hydraulically with an electric control valve) by means of one emergency switch. On restoring the emergency switch, the whole machinery should start again.

The interconnection of the various components of the control device 24 is shown in FIGS. 6A–6D.

A great number of modifications, changes and adaptations are possible within the scope of the inventive idea sketched in principle above. Among such modifications there may be mentioned, for example, particularly designed inlet and outlet curves for the cam rollers 36 when approaching and leaving the guide curves 37 to 40. It is therefore intended that the scope of the invention be limited only by the following claims.

I claim:

1. An infeed conveyor for feeding logs or blocks having first and second ends into a machine for subsequent processing, said infeed conveyor comprising, in combination:
   a. a plurality of endless conveyor means disposed in parallel;
   b. carriage means secured to each of said conveyor means and guided thereby in an endless path, said carriage means being adapted to carry a first end of a log or block and convey the same in the longitudinal direction into the processing machine;
   c. guide means, arranged under the path of movement of said carriage means, for longitudinally movable guidance of the second end of the log or block in a centered position relative to a central, vertical, longitudinal plane through the infeed conveyor;
   d. centering means, arranged on each of said carriage means, for centering and holding said first end of the log or block in said central plane as said first end is carried and conveyed;
   e. drive means, associated with said endless conveyor means, for driving each of said conveyor means independently of the others; and
   f. control means, connected to said drive means and having means for sensing the advancement of logs or blocks to the infeed conveyor, for controlling the movement of said carriage means such that each of said carriage means will carry the intended end of one log or block from one end of the infeed conveyor to the other and then return to a standby position.

2. The infeed conveyor defined in claim 1, wherein each of said conveyor means comprises a pair of parallel chains.

3. The infeed conveyor defined in claim 1, wherein said centering means includes two gripper arms and spring means for urging each one of said gripper arms towards the other, and wherein the infeed conveyor further comprises a first and second means for controlling the position of said gripper arms, said first position-controlling means being arranged at the infeed end of the infeed conveyor and adapted to hold the gripper arms apart to enable them to grip the end of a log or block, and said second position-controlling means being arranged at the discharge end of the infeed conveyor and adapted to move the gripper arms apart on completion of the transport so that the log or block is released.

4. The infeed conveyor defined in claim 3, wherein said gripper arms each include a double-armed lever pivotally journaled on a substantially vertical pivot, said double-armed lever having a first arm for gripping a log or block and a second arm for engaging said first and second position-controlling means, and wherein said first and second position-controlling means are fixed guides arranged at the ends of said infeed conveyor for urging said first arms of gripper arms apart when in engagement with said second arms thereof.

5. The infeed conveyor defined in claim 4 wherein said second arm of said gripper arms is provided with roller means for engaging said fixed guides in rolling contact.

6. The infeed conveyor defined in claim 4, wherein each of said gripper arms include a substantially vertical pivot shaft and a third arm projecting laterally from said pivot shaft and having a mounting for a tension spring; wherein said centering means further includes a rotatable member, lockable in an adjusted position, disposed centrally between the pivot shafts of said gripper arms and having two diametrically opposed spring mountings, and wherein said centering means further includes two tension springs each connected between one of said third arms and said rotatable member.

7. The infeed conveyor defined in claim 6, wherein said two tension springs are removably attached to said third arms and said rotatable member.

8. The infeed conveyor defined in claim 6, wherein said two tension springs are each formed of a strong rubber loop.